United States Patent
Zhang et al.

(10) Patent No.: US 12,432,422 B2
(45) Date of Patent: Sep. 30, 2025

(54) INTERACTION METHOD, APPARATUS, DEVICE, AND STORAGE MEDIUM BASED ON LIVE STREAMING APPLICATION

(71) Applicant: TENCENT TECHNOLOGY (SHENZHEN) COMPANY LIMITED, Guangdong (CN)

(72) Inventors: Yanjun Zhang, Guangdong (CN); Bin Wu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 161 days.

(21) Appl. No.: 17/965,136

(22) Filed: Oct. 13, 2022

(65) Prior Publication Data

US 2023/0035243 A1    Feb. 2, 2023

Related U.S. Application Data

(63) Continuation of application No. PCT/CN2021/119614, filed on Sep. 22, 2021.

(30) Foreign Application Priority Data

Dec. 21, 2020    (CN) .................. 202011519384.X

(51) Int. Cl.
  *H04N 21/4788* (2011.01)
  *H04N 21/2187* (2011.01)
  *H04N 21/488* (2011.01)

(52) U.S. Cl.
  CPC ..... *H04N 21/4788* (2013.01); *H04N 21/2187* (2013.01); *H04N 21/4882* (2013.01)

(58) Field of Classification Search
  CPC .......... H04N 21/4788; H04N 21/2187; H04N 21/4882

See application file for complete search history.

(56) References Cited

U.S. PATENT DOCUMENTS

| | | | |
|---|---|---|---|
| 2014/0279625 A1* | 9/2014 | Carter | G06Q 50/01 705/319 |
| 2016/0006981 A1* | 1/2016 | Bauman | H04N 21/4788 348/14.03 |
| 2016/0277802 A1 | 9/2016 | Bernstein et al. | |

(Continued)

FOREIGN PATENT DOCUMENTS

| | | |
|---|---|---|
| CN | 107801047 A | 3/2018 |
| CN | 109257657 A | 1/2019 |

(Continued)

OTHER PUBLICATIONS

International Search Report for PCT/CN2021/119614 dated Dec. 22, 2021.
Written Opinion for PCT/CN2021/119614 dated Dec. 22, 2021.

*Primary Examiner* — Chenea Davis
(74) *Attorney, Agent, or Firm* — Sughrue Mion, PLLC

(57) ABSTRACT

An interaction method includes displaying a video interaction interface in a live streaming application, the video interaction interface including a social video uploaded by a live streaming account; receiving a selection operation on the social video; and based on a social relationship confirmation signal of the live streaming account, displaying an interaction interface for a social interaction with the live streaming account.

19 Claims, 10 Drawing Sheets

(56) References Cited

U.S. PATENT DOCUMENTS

| | | | | |
|---|---|---|---|---|
| 2017/0048282 | A1* | 2/2017 | Dharmaji | G06F 3/1454 |
| 2019/0280792 | A1* | 9/2019 | Jensen | G06Q 20/123 |
| 2019/0288976 | A1* | 9/2019 | Sharp | G06Q 50/01 |
| 2021/0021663 | A1* | 1/2021 | Zhou | H04L 65/1059 |
| 2021/0044640 | A1* | 2/2021 | He | G10L 15/26 |
| 2021/0046385 | A1* | 2/2021 | Hsiao | A63F 13/48 |

FOREIGN PATENT DOCUMENTS

| | | |
|---|---|---|
| CN | 109660817 A | 4/2019 |
| CN | 111654716 A | 9/2020 |
| CN | 112714327 A | 4/2021 |

* cited by examiner

INTERACTION METHOD, APPARATUS, DEVICE, AND STORAGE MEDIUM BASED ON LIVE STREAMING APPLICATION

CROSS-REFERENCE TO RELATED APPLICATION(S)

This application is a continuation application of International Application No. PCT/CN2021/119614, filed on Sep. 22, 2021, which claims priority to Chinese Patent Application No. 202011519384.X, filed with the China National Intellectual Property Administration on Dec. 21, 2020, the disclosures of which are incorporated by reference in their entireties.

FIELD

The present disclosure relates to the field of live streaming programs, and in particular, to an interaction method, apparatus, device, and storage medium based on a live streaming application.

BACKGROUND

A live streaming application is an application project that aims to provide streamer accounts with a platform for live streaming and provide audience accounts with a platform for watching live streams. That is, a user may log into an account in the live streaming application and initiate a live stream through the logged-in account to provide a live streaming video to a watch account, or may be used as a watch account to watch a live streaming video of a streamer account.

In the related art, in the live streaming application, users can interact with a streamer account by watching a live stream and can transmit, through chat dialog boxes, private messages to the streamer account, and the streamer account can view the private messages in the chat dialog boxes and selectively reply to a chat message to a user account.

However, in the foregoing methods, interaction can be performed only through private messages or live streaming rooms for both the streamer accounts and the audience accounts. The interaction method is relatively undiversified, and the diversity of interaction modes is poor.

SUMMARY

According to various embodiments, an interaction method based on a live streaming application, performed by a computer device, may include: displaying a video interaction interface in the live streaming application, the video interaction interface including a video display area of at least one live streaming account, and the video display area including a social video uploaded by the at least one live streaming account; receiving a social selection operation on the video interaction interface based on the social video, the social selection operation being used for establishing a one-way social relationship between a target account and the live streaming account corresponding to the social video, and the target account being a currently logged-in account in the live streaming application; and in response to a social relationship confirmation signal of the live streaming account corresponding to the social video, displaying a social interaction interface for a social interaction with the live streaming account corresponding to the social video, the social interaction interface including a live streaming room channel for starting a live streaming room of the live streaming account corresponding to the social video.

According to various embodiments, an interaction apparatus, a computer device, a non-transitory computer-readable storage medium, and a computer program product or computer program consistent with the interaction method may also be provided.

Details of the various embodiments are provided in the accompanying drawings and descriptions below. Other features, objectives, and advantages the embodiments will become apparent from the specification, the accompanying drawings, and the claims.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1:
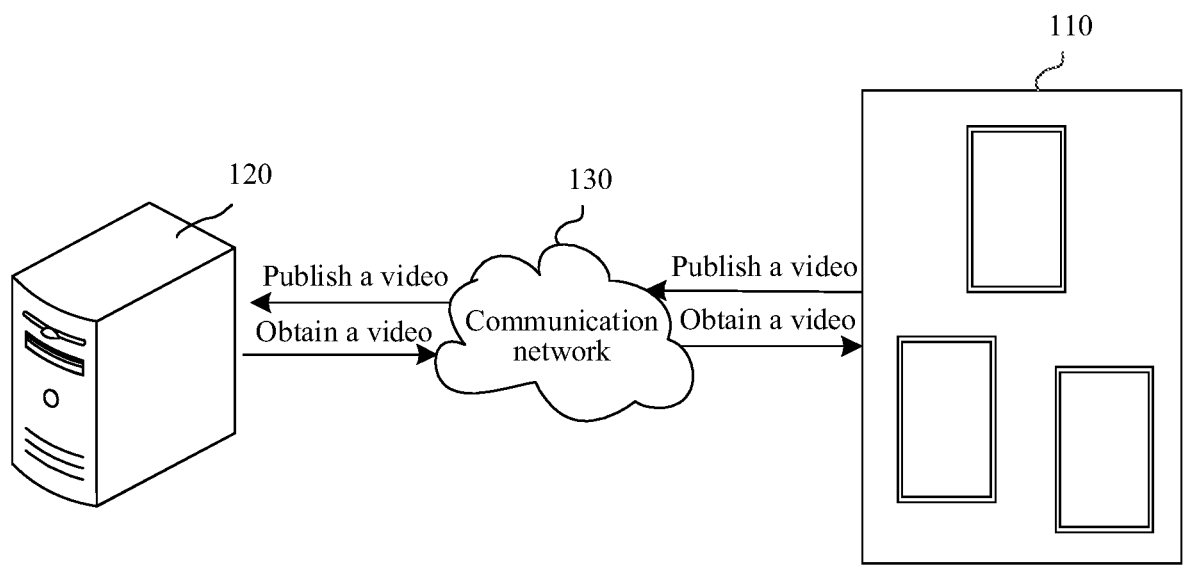
FIG. 1 is a schematic diagram of an implementation environment according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

First, terms involved in the embodiments are briefly introduced.

Live streaming: It refers to a technology of acquiring data of a streamer party by a device, performing a series of processing to convert the data into a video stream that can be transmitted, for example, encoding and compressing a video to convert the video into a video stream, and outputting the video stream to a watch terminal for playing. The live streaming application provided in some embodiments refers to an application that provides a we-media platform. In other words, after a user registers an account in the live streaming application, the user can initiate a live streaming room with the user as a streamer. Initiation of the live streaming room includes or does not include conditional restrictions. In some embodiments, a user account opens a live streaming room by applying for qualification. In some other embodiments, a user account can open a live streaming room for live streaming after directly selecting to start a live stream in a user interface of the live streaming application and filling in information of the live streaming room.

Social video: It refers to a video uploaded by a live streaming account in a live streaming application for interacting with another live streaming account in some embodiments. In some embodiments, the social video is a video uploaded in a video match function by a live streaming account in a live streaming application. In other words, the social video is used for matching another live streaming account in the video match function, and the matching process is also a process for selecting a social relationship between live streaming accounts. For example, after a live streaming account A uploads a social video, a live streaming account B first selects, based on the social video uploaded by the live streaming account A, to establish or not to establish a one-way social relationship with the live streaming account A, and in a case that the live streaming account B selects to establish the one-way social relationship with the live streaming account A, the live streaming account A can select whether to establish a two-way social relationship with the live streaming account B. The social video may be a video cut from a live streaming video by a live streaming account, or may be a video selected by a live streaming account from locally stored videos, or may be a video photographed by a live streaming account before uploading.

A name of the social video is only a schematic example, and the social video may alternatively be an interaction video, a match video, a dating video, and the like, which is not limited herein.

FIG. 1 is a schematic diagram of an implementation environment according to some embodiments. Referring to FIG. 1, the implementation environment includes a terminal 110 and a server 120, where the terminal 110 and the server 120 are connected to each other through a communication network 130.

The terminal 110 is installed with the live streaming application provided in some embodiments. The live streaming application may provide a social interaction function based on a video. The social interaction function may also be referred to as a video speed match function or a video match function. The video match function refers to a function of performing friend match by uploading a social video, and a user may actively perform friend match by filtering videos in the video match function, or may passively perform friend match by uploading a video. In other words, another user establishes a friend relationship with the user after watching the video uploaded by the user. In some embodiments, the video match function is combined with live streaming, so that the social diversity of the live streaming application is enriched.

Figure 2:
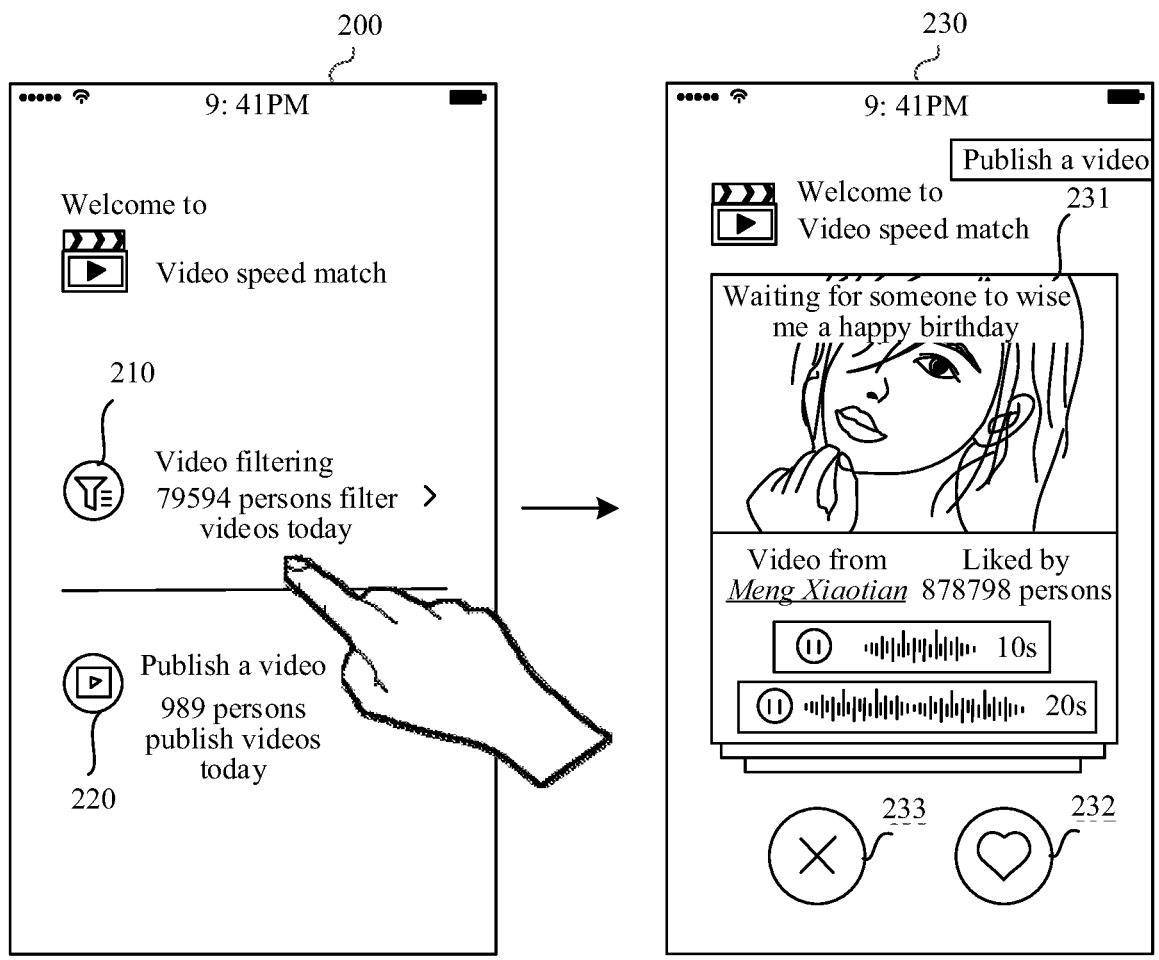
FIG. 2 is a schematic diagram of an interface of a video match function according to some embodiments.

After logging into a user account in the live streaming application in the terminal 110, a user can watch a live streaming video in the live streaming application based on the user account or publish a live streaming video, and can also watch a social video published by another user in the video match function, to establish a social relationship with another user account; or can publish a social video in the video match function based on the user account, so that another user can view the video published by the user account and select to establish a social relationship with the current user account. FIG. 2 illustrates a schematic diagram of an interface of a video match function according to some embodiments. The interface is a video match interface 200, and the video match interface 200 displays a video filtering option 210 and a video publishing option 220. The video filtering option 210 is used for indicating viewing and selecting a video published by another user account, the video publishing option 220 is used for indicating publishing a video in the video match function, so that another user account can view and select the video published by the current user. In a case that the terminal 110 receives a selection operation on the video filtering option 210, the terminal may display a video interaction interface 230. The video interaction interface 230 displays a social video 231 published by at least one streamer account, a like control 232, and a cancel control 233. The like control 232 is used for indicating establishing a one-way social relationship between the current user account and the streamer account. The cancel control 233 is used for indicating refusing to establish a one-way social relationship between the current user account and the streamer account.

The server 120 may provide functions of video data obtaining and video data storage to the terminal 110. In other words, the terminal 110 may transmit a video published by a user to the server 120 for storage. In a case that the terminal 110 needs to view a social video published by a specific user account during use of the video match function, the terminal may obtain the video from the server 120 for playing. The server 120 may also provide a function of information exchange between a plurality of terminals. For example, a message transmitted by a first terminal to a second terminal may be forwarded by the server 120.

The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited herein.

Figure 3:
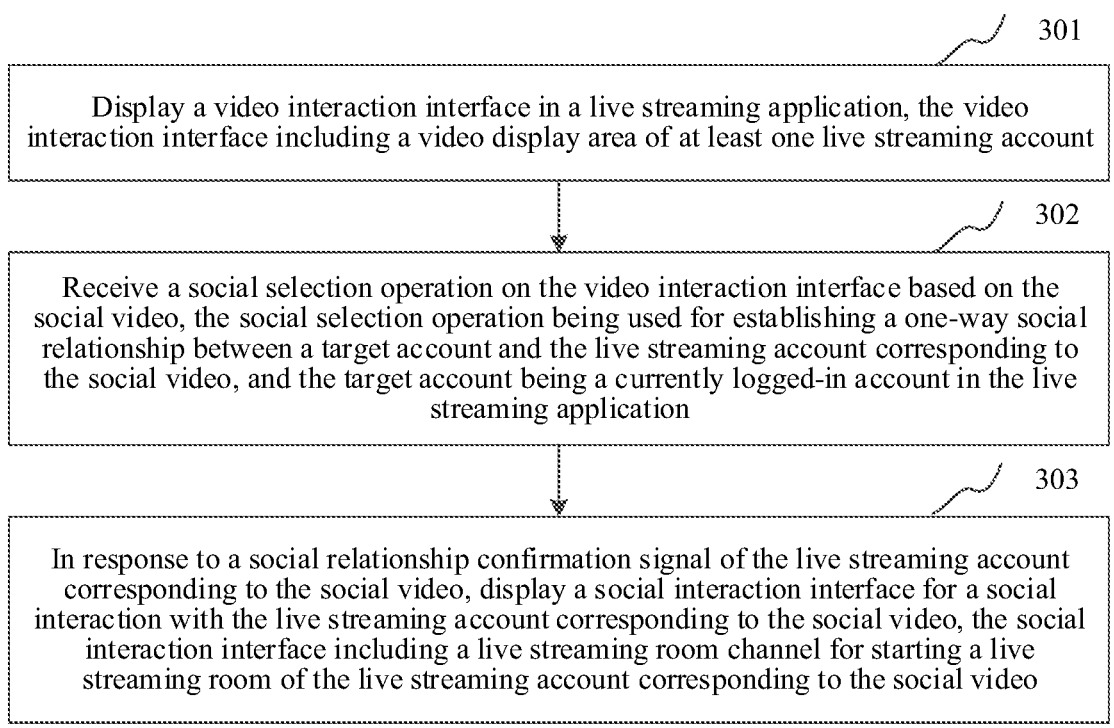
FIG. 3 is a flowchart of an interaction method based on a live streaming application according to some embodiments.

With reference to the foregoing description of the terms and the implementation environment, the interaction method based on a live streaming application according to some embodiments is described. A description is made by using an example in which the method is applied to a terminal shown in FIG. 2. As shown in FIG. 3, the method includes the following operations:

Operation 301: Display a video interaction interface in a live streaming application, the video interaction interface including a video display area of at least one live streaming account.

The video display area includes a social video uploaded by the at least one live streaming account. A user account may include a variety of types, for example, at least one of a streamer account, an audience account, a visitor account, or a universal account. The audience account may watch a live streaming video of a streamer account in the live streaming application, that is, enter a live streaming room of the streamer account to watch live streaming content of the streamer account, or enter a live streaming room of the streamer account to play live streaming content of the streamer account. The streamer account may perform a live stream in the live streaming application. A terminal of the streamer account may acquire a video or an audio and transmit the acquired video or audio to a server, and the server may transmit the received video or audio to a terminal corresponding to an audience account. The visitor account is neither an account that initiates a live stream in the live streaming application, nor an account that watches a live stream in the live streaming application. The visitor account may use another function in the live streaming application. The universal account is an account that may initiate a live stream in the live streaming application, or may watch a live stream in the live streaming application, or may use another function in the live streaming application. The live streaming account may be either a streamer account or a universal account.

An account currently logged into the live streaming application in the terminal is a target account, and the target account may be an account of any type, for example, the target account may be any of a live streaming account, an audience account, a visitor account, or a universal account.

In some embodiments, the target account is a universal account, the live streaming account is an account registered in the live streaming application, the live streaming account may be either a streamer account or a universal account, and the live streaming account has a function of initiating a live stream.

In some embodiments, the terminal may display, in the video display area, the social video uploaded by the at least one live streaming account in form of a card, and social videos uploaded by a plurality of live streaming accounts may be displayed in form of overlapped cards. A card corresponding to a social video may be referred to as a social video card, and a method for displaying the social video card includes at least one of the following:

1. The terminal displays stacked social video cards in the video display area. A card stacked at the top is a card viewed by the current target account and selected for social interaction, and the other cards are covered by the top card with only part of the cards visible, or the cards stacked below cannot be perceived in the video display area. The terminal may display a social selection control in the video interaction interface, and a selection operation on the social selection control is used for indicating a selection result of the card stacked at the top. In a case that the terminal receives a trigger operation on the social selection control, the terminal may perform a selection operation on the card stacked at the top, to select the social video card stacked at the top.

2. The terminal displays a plurality of (that is, at least two) social video cards side by side in the video display area. A user can select, from the plurality of social video cards, a social video for playing. There is an independent social selection control for each social video card in the video interaction interface, that is, the video interaction interface may display social selection controls respectively corresponding to the social video cards, and a user can select a social selection control corresponding to one of the social video cards, to indicate a selection result of the selected social video card. In a case that the terminal receives a trigger operation on the social selection control, for example, a click/tap operation on the social selection control, the terminal may determine a social video card corresponding to the social selection control and perform a selection operation on the video social card, to select the corresponding social video card.

3. The terminal first displays account information cards of at least two live streaming accounts in the video display area, and a user can select at least one account information card, to play a social video of the selected live streaming account. The interface displays a group of social selection controls, and a selection operation on a social selection control is used for indicating a selection result of a live streaming account corresponding to a currently playing social video. The account information card refers to a card which includes account information, and one account information card may identify one user account. In a case that the terminal receives a trigger operation on the account information card, for example, in a case that the account information card is clicked/tapped on, the terminal may obtain a social video of a user account corresponding to the account information card and play the obtained social video. The social selection control is a control used for selecting an account information card. The terminal may set corresponding social selection controls for account information cards. In a case that the terminal receives a trigger operation on the social selection control, the terminal determines an account information card corresponding to the social selection control and plays a social video of a live streaming account identified by the account information card.

The display method in the video display area is only a schematic example, and the method for displaying a social video in the video display area is not limited herein.

In some embodiments, the video display area also displays at least one social voice uploaded by the live streaming account, and a user may select to play the social video, or may select to play the social voice. The social video and social voice match each other; or, the social video and the social voice are independent of each other. In a case that the social video and the social voice match each other, it means that the social voice is an audio corresponding to the social video during playing. In a case that social video and social voice are independent of each other, the live streaming account records the social video separately and records the social voice separately. In some embodiments, in a case that the video display area includes at least two social voices, one of the social voices is corresponding to the social video, and the other social voice is independent of the social video; or, the two social voices both are independent of the social video; or, the two social voices are corresponding to different segments of the social video, respectively.

In some embodiments, the video display area also displays comment content that another user account comments on the social video.

Figure 4:
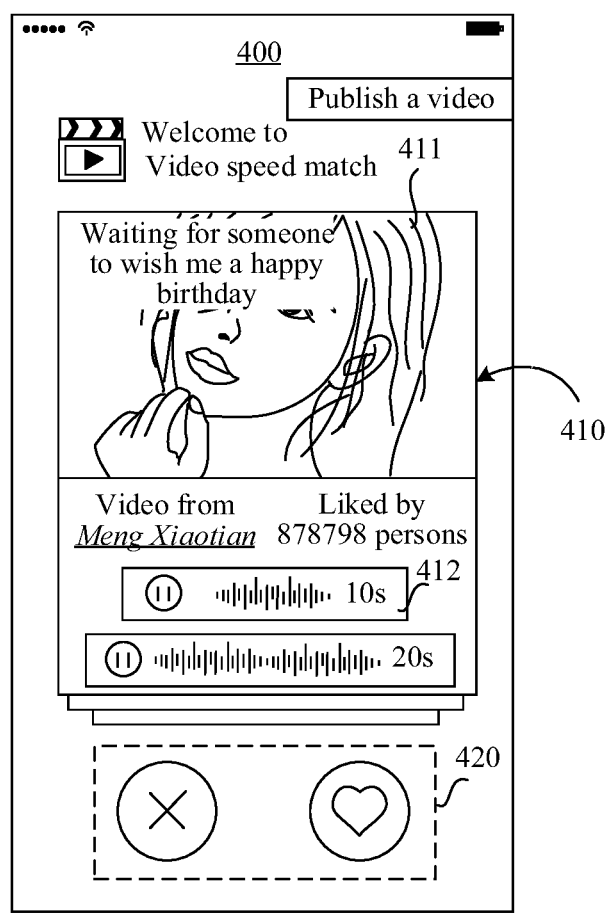
FIG. 4 is a schematic diagram of an interface of a social selection control according to some embodiments.

In this embodiment, a description is provided by an example in which the video interaction interface displays a group of social selection controls. As shown in FIG. 4, a video interaction interface 400 includes a video display area 410, and the video display area 410 displays a social video 411 published by a live streaming account in form of a card. The video display area 410 also includes a social voice 412 published by the live streaming account, and a quantity of times the current social video 411 is liked. The video interaction interface 400 also includes a social selection control 420, and a user may select on the social selection control 420, to select whether to establish a social relationship with the live streaming account. The social selection control 420 includes a like control and a cancel control. In a case that the terminal receives a trigger operation on the like control in the social selection control 420, for example, a click/tap operation, the terminal may establish a social relationship between the target account and the live streaming account. For example, the terminal may transmit a social relationship establishment request to the terminal corresponding to the live streaming account, and a terminal of the live streaming account may obtain a response result in response to the social relationship establishment request, and return the response result to the terminal of the target account. In a case that the response result is consenting to establish a social relationship, the social relationship between the target account and the live streaming account is successfully established, and in a case that the terminal receives a trigger operation, for example, a click/tap operation, on the cancel control in the social selection control 420, the terminal may refuse to establish a social relationship between the target account and the live streaming account.

The selection operation of the target account on the social selection control can only determine whether to establish a one-way social relationship between the target account and the live streaming account. In other words, the target account initiates, to the live streaming account, an application for a social relationship.

Operation 302: Receive a social selection operation on the video interaction interface based on the social video, the social selection operation being used for establishing a one-way social relationship between a target account and the live streaming account corresponding to the social video.

The target account is a currently logged-in account in the live streaming application. In other words, an account currently logged into the live streaming application in the terminal. The one-way social relationship refers to a semi-social relationship in which the target account selects to establish a social relationship with the live streaming account and the live streaming account has not yet determined to establish the social relationship. In a case that the live streaming account does not confirm the one-way social relationship, establishment of the social relationship between the live streaming account and the target account fails, or the target account maintains the one-way social relationship with the live streaming account until a preset duration expires. The live streaming account refers to a user account corresponding to the social video.

In some embodiments, a description is provided by an example in which the social video is displayed in form of a social video card, that is, the first method among the methods for displaying the social video card in operation 301, the method for receiving the social selection operation includes at least one of the following:

First, the video interaction interface displays a social selection control. The social selection control may include a like control and a cancel control. The like control may also be referred to as a social intention control, and the cancel control may also be referred to as a social cancel control. Whether a social selection operation is received is determined according to a selection operation received on the social selection control. Schematically, the video interaction interface displays a social intention control and a social cancel control. The social intention control is used for indicating that the target account has an intention to establish a social relationship with the live streaming account. The cancel control is used for indicating that the target account does not have an intention to establish a social relationship with the live streaming account. Therefore, in a case that the terminal receives a selection operation on the social intention control, that is, it is determined that a social selection operation is received, which indicates that the current target account has an intention to establish a social relationship with the live streaming account, and therefore a one-way social relationship for which the target account applies to the live streaming account is established.

Second, the social video card is in form of a slideable card. In a case that the terminal receives an operation of sliding in a first direction on the social video card, it indicates that the target account has an intention to establish a social relationship with the live streaming account. In a case that the terminal receives an operation of sliding in a second direction on the social video card, it indicates that the target account does not have an intention to establish a social relationship with the live streaming account. The first direction and the second direction are different, the first direction and the second direction may be preset or set according to needs, the first direction may be, for example, a leftward direction, and the second direction may be, for example, a rightward direction.

In some embodiments, the social video card performs a corresponding animation response in the video interaction interface according to a sliding operation by a user. For example, in a case that the terminal receives a leftward sliding operation on the social video card, the terminal may display an animation in which the social video card flies out of the video interaction interface in the leftward direction.

Third, the social video card is provided with a corresponding social intention control, and the video social card is in form of a slideable card. In a case that the terminal receives a sliding operation on the social video card in any direction, it indicates that the target account does not have an intention to establish a social relationship with the live streaming account. In a case that the terminal receives a selection operation on the social intention control, it indicates that the target account has an intention to establish a social relationship with the live streaming account.

A specific form of the social selection operation is not limited in herein.

The live streaming account is used for indicating a live streaming account corresponding to the social video.

Operation 303: In response to a social relationship confirmation signal of the live streaming account corresponding to the social video, display a social interaction interface for a social interaction with the live streaming account corresponding to the social video.

The social relationship confirmation signal is a signal transmitted by the live streaming account to confirm establishment of the social relationship with the target account after the live streaming account receives a social prompt corresponding to the one-way social relationship. In some embodiments, the social interaction interface includes a live streaming room channel for starting a live streaming room of the live streaming account corresponding to the social video. In other words, the live streaming account corresponding to the social video is used as a streamer account of the live streaming room.

Being in response to the social relationship confirmation signal of the live streaming account corresponding to the social video indicates that a two-way social relationship is established between the live streaming account and the target account. The two-way social relationship includes a friend relationship, a two-way concern relationship, a relationship of participating in a live stream as an interaction streamer, and the like, which is not limited herein.

By the interaction method based on a live streaming application according to some embodiments, a video match function is provided to a target account in the live streaming application, the target account can select whether to establish a one-way social relationship with another account by checking a video published by the another account, so as to establish a two-way social relationship between the accounts after confirmation, so that the target account can watch a live stream through the social relationship, thereby increasing channels for watching a live stream, increasing methods for socializing between the accounts in the live streaming application, improving the social diversity, and increasing methods of interaction between the accounts.

In some embodiments, the social interaction interface may include any of a chat dialog box between the live streaming account and the target account, a video interface for a video call interaction between the live streaming account and the target account, a live streaming interface for the live streaming account and the target account as interaction streamers, and a live stream entrance interface for the target account as an audience account to watch the live streaming room of the live streaming account. Display of the social interaction interface includes any of the following situations:

First, the dialog box interface for a chat interaction between the live streaming account corresponding to the social video and the target account is displayed.

In other words, a friend relationship is established between the live streaming account and the target account, and therefore the chat dialog box between the live streaming account and the target account is displayed.

Second, the video interface for a video call interaction between the live streaming account corresponding to the social video and the target account is displayed.

In other words, a friend relationship is established between the live streaming account and the target account, and the interface of a video call interaction between the two accounts is directly displayed. In some embodiments, the dialog box interface between the live streaming account and the target account is first displayed, the dialog box interface includes a video start control, and in a case that a selection operation on the video start control is received, a video interaction between the live streaming account and the target account is initiated.

Figure 5:
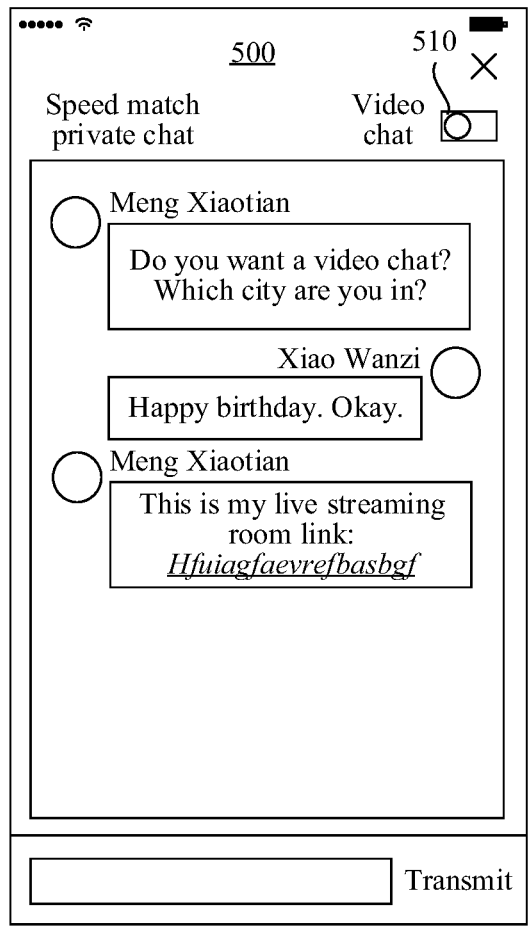
FIG. 5 is a schematic diagram of a dialog box interface displayed after a social relationship is established according to some embodiments.

As shown in FIG. 5, in a case that the live streaming account determines to establish a social relationship with the target account, a dialog box interface 500 is displayed, the dialog box interface 500 includes a video start control 510, and in a case that a selection operation on the video start control 510 is received, a video interaction between the two parties is initiated. The video start control 510 is displayed only in a dialog box interface of the live streaming account, or the video start control 510 is displayed only in a dialog box interface of the target account, or the video start control 510 is displayed in dialog box interfaces of both the target account and the live streaming account.

Figure 6:
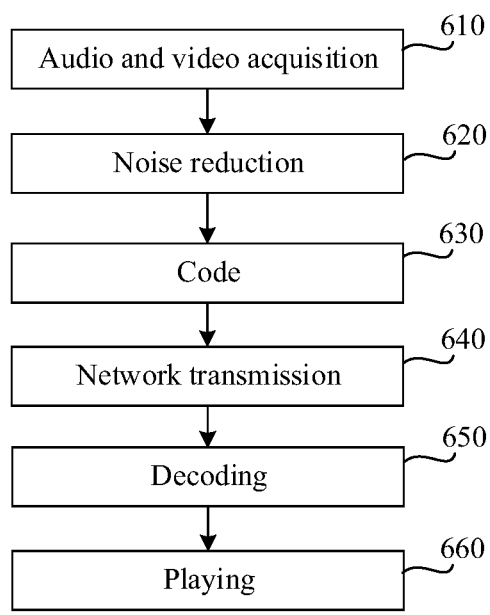
FIG. 6 is a schematic diagram of a main process of a video chat according to some embodiments.

In some embodiments, as shown in FIG. 6, the main process of a video chat includes six parts: audio and video acquisition 610, noise reduction 620, encoding 630, network transmission 640, decoding 650, and playing 660.

The acquisition is to obtain voice and image information of a user through a microphone and a camera. The acquisition of a voice signal is to convert, through the microphone, an analog signal of sound waves into a digital signal that can be transmitted over a network. The size of acquired data and the degree of clarity of the voice are determined by a sampling frequency, a sampling depth, and a quantity of channels. During a video call, a user usually plays out the sound, and the microphone collects the played sound indiscriminately and transmits the sound to a next module. In this case, echo and self-excitation may occur. Therefore, an acquisition module needs to perform a cancellation operation, which is implemented by filtering the newly played sound from the acquired signal. According to features of a voice signal, the voice signal is extracted from a signal after the cancellation operation, and the remaining signal is removed, to implement noise reduction, thereby increasing the signal-to-noise ratio.

The encoding is to encode the acquired original voice and image signal to reduce the data volume. The encoding is a way of compression. Image encoding may remove, by using spatial and temporal redundancy, duplicate or similar content, to retain significant information and not to affect watching by a user. Voice encoding may compress an original signal by using temporal redundancy. The data size of the encoded data can be greatly reduced, thereby reducing the data transmission time, improving the real-time performance of a chat, saving the network bandwidth, and reducing the traffic charges.

The transmission is to transmit the encoded data to another user, for example, transmitted from the target account to the live streaming account, and in order to improve the real-time performance of a chat, data is transmitted by using an audio and video streaming protocol herein. In addition, in order to ensure the availability of functions, a transmission module needs to monitor network status in real time, and in a case that a network speed decreases, the transmission module needs to notify an encoding module to reduce a bit rate, to reduce bandwidth requirements and improve the real-time performance.

The decoding is an inverse process of the encoding and is to restore the received encoded data to the original data.

A playing module transmits the original data to a sound card and a graphics card for playing, and in addition needs to synchronize time stamps to maintain the consistency between images and sound.

Third, the live streaming interface for the live streaming account corresponding to the social video and the target account as interaction streamers is displayed.

In other words, in a case that a two-way social relationship is established between the target account and the live streaming account, the live streaming interface for a video interaction live stream between the live streaming account and the target account is displayed, the live streaming interface being corresponding to a live streaming room of the live streaming account; or, the live streaming interface being corresponding to a live streaming room of the target account; or, the live streaming interface being corresponding to an interaction live streaming room shared by both parties.

Fourth, the live stream entrance interface for the target account as an audience account to watch the live streaming room is displayed.

In other words, in a case that the live streaming account accepts to establish the social relationship with the target account, the live stream entrance interface is displayed, and the live stream entrance interface includes the live stream entrance control. In other words, in a case that the target account selects the live stream entrance control, the target account enters the live streaming room of the live streaming account to watch a live stream.

In some embodiments, the live stream entrance interface is displayed, the live stream entrance interface including a live stream entrance control, the live stream entrance interface being used for providing a live streaming room channel for entering the live streaming room, and the live streaming account corresponding to the social video being used as a streamer account of the live streaming room; and a trigger operation on the live stream entrance control is received, and a live streaming room interface is displayed based on the trigger operation, the live streaming room interface including a screen in which the live streaming account corresponding to the social video performs a live stream.

To sum up, by the interaction method based on a live streaming application according to some embodiments, a video match function is provided to a target account in the live streaming application, the target account can select whether to establish a one-way social relationship with another account by checking a video published by the another account, so as to establish a two-way social relationship between the accounts after confirmation, so that the target account can watch a live stream through the social relationship, thereby increasing channels for watching a live stream, increasing methods for socializing between the accounts in the live streaming application, improving the social diversity, and increasing methods of interaction between the accounts.

Figure 7:
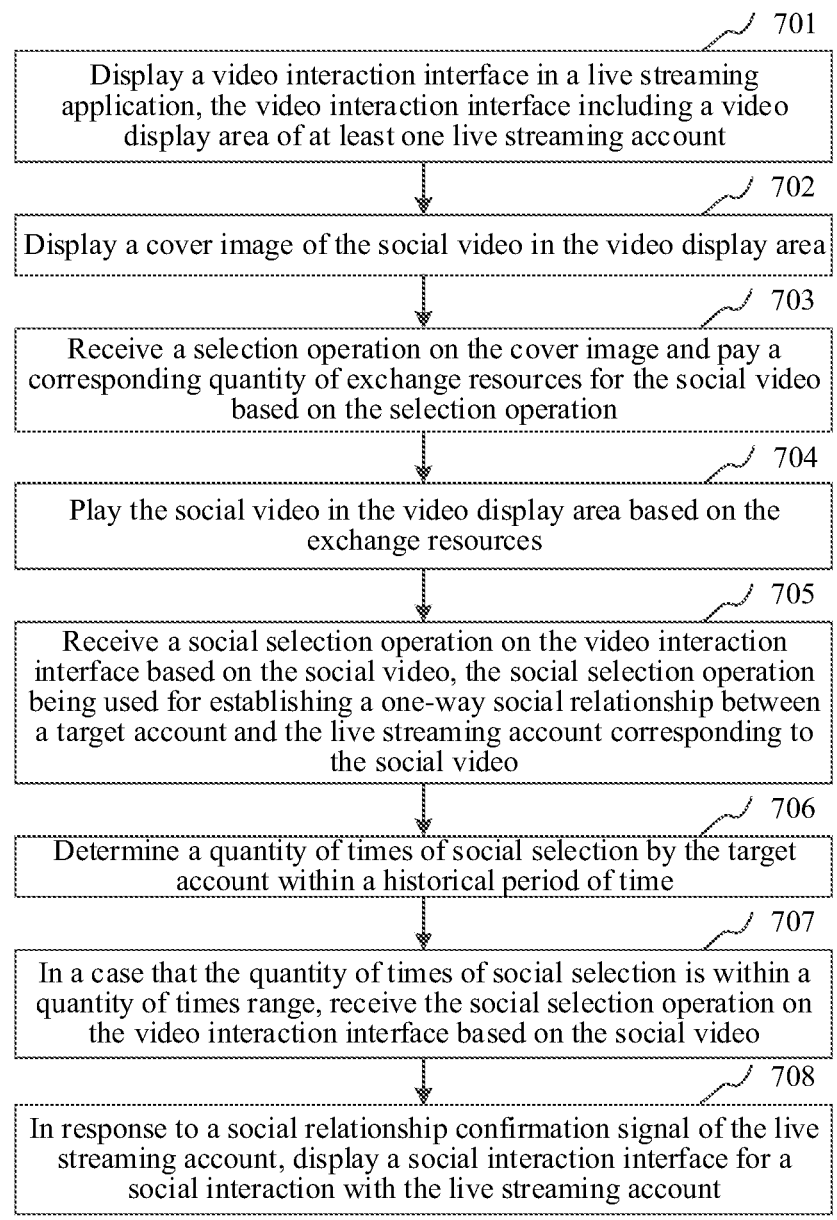
FIG. 7 illustrates an interaction method based on a live streaming application according to some embodiments.

In some embodiments, there is a limit for a quantity of times of establishment of the one-way social relationship by the target account with the live streaming account. FIG. 7 illustrates an interaction method based on a live streaming application according to some embodiments. A description is provided by an example in which the method is applied to a terminal. As shown in FIG. 7, the method includes the following operations:

Operation 701: Display a video interaction interface in a live streaming application, the video interaction interface including a video display area of at least one live streaming account.

The video display area includes a social video uploaded by the at least one live streaming account.

Operation 702: Display a cover image of the social video in the video display area.

The cover image is an image obtained by blurring an original image. The original image is an image corresponding to the social video set by the target account.

In some embodiments, the terminal may obtain an original image, determine a blurring window in the original image, the blurring window being a processing window for blurring the original image, determine a weight value for a pixel in the blurring window by using a central pixel as a reference, adjust a pixel value of the pixel based on the weight value, to obtain the cover image, and display the cover image of the social video in the video display area.

In some embodiments, the terminal may display the original image or a blurred image, and to display the blurred image, the original image needs to be blurred, weight calculation is performed on pixels around a central pixel in the blurring window, and a central pixel value is replaced with a calculated pixel value. A commonly used blurring method includes median blurring, mean blurring, and Gaussian blurring. The median blurring is to sort values of surrounding pixels in a window, extract a median value of a sequence, and replace a central pixel value with the median value. The mean blurring is to calculate an average of surrounding data in a window and replace a central value with the value. The Gaussian blurring is to calculate weight values of surrounding pixels in a blurring window. The weight values are based on Gaussian normal distribution. A smaller distance from a central pixel indicates a greater weight value; and a greater distance indicates a smaller weight value. The size of the blurring window affects the effect of blurring. A greater window radius indicates a higher degree of blurring. Based on an actual effect, the Gaussian blurring is used in some embodiments, and the blurring radius is 10.

In the method provided in this embodiment, before displaying the social video, the blurred cover image is first displayed, and the social video is played after receiving a resource exchange operation, thereby improving the attractiveness of the social video and improving the diversity of social interactions.

Operation 703: Receive a selection operation on the cover image and pay a corresponding quantity of exchange resources for the social video based on the selection operation.

The exchange resource refers to a resource that need to be paid for, to obtain the social video corresponding to the cover image of the target account. The exchange resource may be a virtual resource, for example, a social video published by the target account, and certainly may also be another resource. The quantity of exchange resources may be a resource size of the exchange resources, or the quantity of exchange resources may be a quantity of social videos. For example, in a case that the social video corresponding to the cover image needs to be obtained, the target account can obtain the social video corresponding to the cover image by sharing three videos with the account corresponding to the social video. The quantity of exchange resources is set during publishing of the social video by the live streaming account; or, the quantity of exchange resources is preset by the platform; or, the quantity of exchange resources is randomly determined; or, the quantity of exchange resources is determined based on a quantity of likes of the social video. The method for determining the quantity of exchange resources is not limited in herein.

Operation 704: Play the social video in the video display area based on the exchange resources.

Operation 705: Receive a social selection operation on the video interaction interface based on the social video, the social selection operation being used for establishing a one-way social relationship between a target account and the live streaming account corresponding to the social video.

Figure 8:
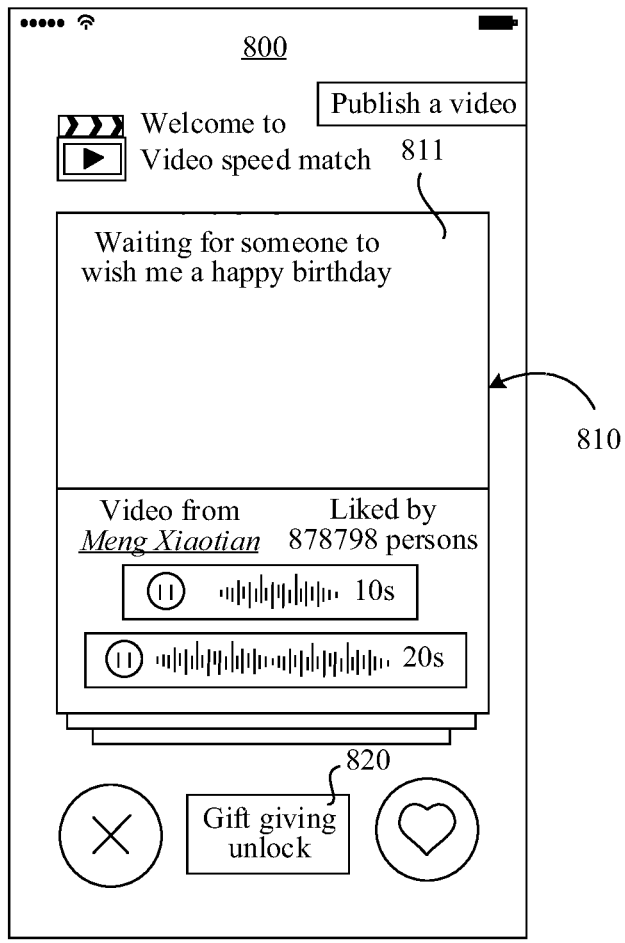
FIG. 8 is a schematic diagram of a process for resource exchanging according to some embodiments.

As shown in FIG. 8, a video interaction interface 800 includes a video display area 810, a blurred cover 811 of a social video is displayed in the video display area 810, a resource exchange control 820 is also displayed below the video display area 810, and a requested quantity of exchange resources is displayed on the resource exchange control 820, so that a user watches the social video after paying the corresponding quantity of exchange resources through the resource exchange control 820.

Operation 706: Determine a quantity of times of social selection by the target account within a historical period of time.

The quantity of times of social selection is used for indicating a quantity of live streaming accounts that the target account selects to like and to establish a one-way social relationship, or the quantity of times of social selection may be used for indicating a quantity of social videos of the live streaming account watched by the target account.

For example, the terminal may determine a quantity of times of social selection within a current date by the target account. The quantity of times of social selection is used for indicating a quantity of live streaming accounts that the target account selects to like and to establish a one-way social relationship; or, the quantity of times of social selection is used for indicating a quantity of social videos of the live streaming account watched by the target account.

Operation 707: In a case that the quantity of times of social selection is within a quantity of times range, receive the social selection operation on the video interaction interface based on the social video.

In some embodiments, the terminal may determine a target account permission corresponding to the target account and determine the quantity of times range corresponding to the target account according to the target account permission. The target account permission may be any of the first account permission or the second account permission, the first account permission being higher than the second account permission, the first account permission being corresponding to the first range, the second account permission being corresponding to the second range, and the first range being greater than the second range. In a case that the account permission of the target account is the first account permission, the quantity of times range is the first range. In a case that the account permission of the target account is the second account permission, the quantity of times range is the second range. The first account permission may be, for example, an account permission corresponding to a member account, and the second account permission may be, for example, an account permission corresponding to a common account. For example, in a case that the target account is a member account, the account permission of the target account is the first account permission, and in a case that the first range of the first account permission is 100 times, the quantity of times range is 100 times. In a case that the target account is a common account, the account permission of the target account is the second account permission, and in a case that the second range of the second account permission is 20 times, the quantity of times range is 20 times.

By the method provided in this embodiment, during receiving of a social selection operation, a quantity of times of social selection is first determined, and in a case that the quantity of times of social selection is within a quantity of times range, it is determined that the social selection operation is effective, so that the target user is prevented from performing social selection on social videos of a plurality of live streaming accounts within a short period of time, which results in the reduction in the efficacy of the social selection.

Operation 708: In response to a social relationship confirmation signal of the live streaming account, display a social interaction interface for a social interaction with the live streaming account.

In some embodiments, the social relationship confirmation signal may be a signal transmitted by the live streaming account to confirm establishment of the social relationship with the target account after the live streaming account corresponding to the social video receives a social prompt corresponding to the one-way social relationship. In some embodiments, the social interaction interface includes a live streaming room channel for starting a live streaming room of the live streaming account corresponding to the social video.

The terminal being capable of responding to the social relationship confirmation signal of the live streaming account corresponding to the social video indicates that a two-way social relationship is established between the live streaming account and the target account. The two-way social relationship includes a friend relationship, a two-way concern relationship, a relationship of participating in a live stream as an interaction streamer, and the like, which is not limited in herein.

To sum up, by the interaction method based on a live streaming application according to some embodiments, a video match function is provided to a target account in the live streaming application, the target account can select whether to establish a one-way social relationship with another account by checking a video published by the another account, so as to establish a two-way social relationship between the accounts after confirmation, so that the target account can watch a live stream through the social relationship, thereby increasing channels for watching a live stream, increasing methods for socializing between the accounts in the live streaming application, improving the social diversity, and increasing methods of interaction between the accounts.

Figure 9:
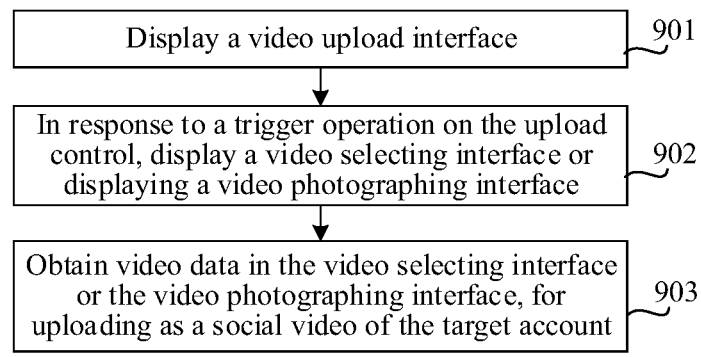
FIG. 9 is a flowchart of an interaction method based on a live streaming application according to some embodiments.

In some embodiments, the target account not only can select the social video in the live streaming application for watching, but also can upload a social video of the target account. FIG. 9 is a flowchart of an interaction method based on a live streaming application according to some embodiments. A description is made by using an example that the method is applied to a terminal. As shown in FIG. 9, the method includes:

Operation 901: Display a video upload interface.

The video upload interface refers to an interface for uploading a social video, and the video upload interface includes an upload control. In some embodiments, a target account may upload only one video as a social video, or the target account may upload a plurality of videos as social videos, the plurality refers to at least two.

Figure 10:
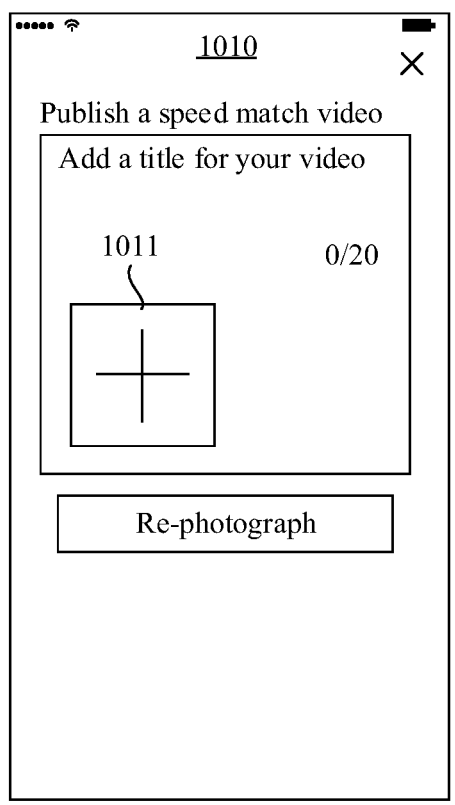
FIG. 10 is a schematic diagram of a process for uploading a social video according to some embodiments.

As shown in FIG. 10, a terminal displays an upload control 1011 in a video upload interface 1010. In a case that the terminal receives a selection operation on the upload control 1011, a terminal corresponding to the target account may upload a social video.

Operation 902: In response to a trigger operation on the upload control, display a video selecting interface or a video photographing interface.

In some embodiments, determining a social video by the target account includes at least one of the following methods:

first, selecting video data to be uploaded as a social video in the video selecting interface; and second, photographing video data in the video photographing interface to obtain a social video for uploading.

Operation 903: Obtain video data in the video selecting interface or the video photographing interface, for uploading as a social video of the target account.

For the obtaining of video data, a description is provided in combined with the foregoing two interfaces, and the obtaining of video data mainly includes at least one of the following methods:

1.1 The interface displayed is the video selecting interface, and the video selected by the target account is a live streaming video during a historical live stream process.

In other words, the target account edits video clips during the historical live stream process, to obtain a social video. For example, a highlight moment during the historical live stream process is intercepted.

1.2 The interface displayed is the video selecting interface, and the video selected by the target account is a video stored locally by the terminal. For example, a local album is called in the video selecting interface, and a video stored in the terminal is selected as the social video from the local album.

2.1 The interface displayed is the video photographing interface, and the target account directly photographs a video in the video photographing interface, that is, video data and audio data are acquired through the terminal, to obtain the social video for uploading.

In some embodiments, during the uploading of the social video, the target account may select to upload the social video in a paid mode. In other words, another account needs to pay a corresponding exchange resource to view the social video. In this case, during displaying of the social video, bluffing is added, to display in form of a bluffed cover image.

In some embodiments, the target account can also edit a selected video clip. An editing function includes functions such as temporal editing, area editing, and hue selection.

Figure 11:
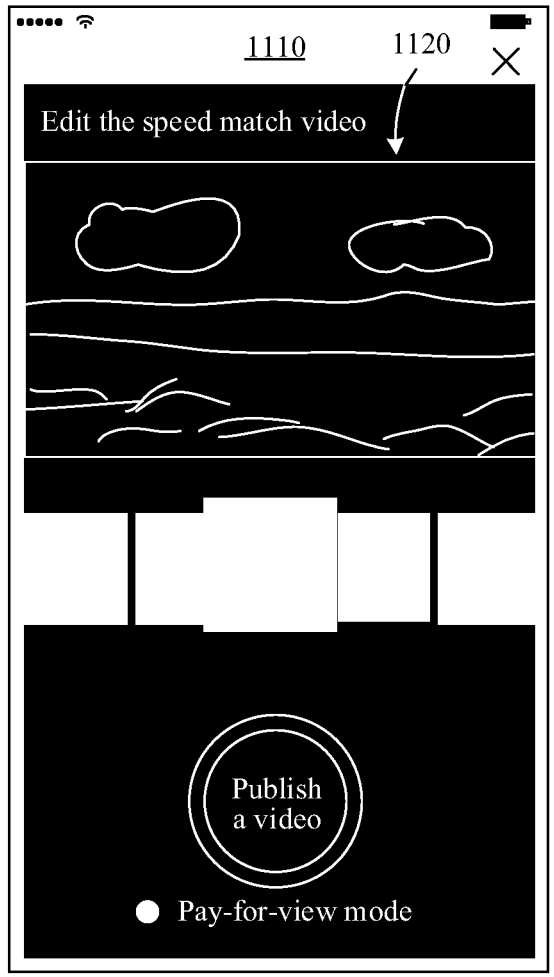
FIG. 11 is a schematic diagram of an edit preview process according to some embodiments.

As shown in FIG. 11, the editing function may provide a preview function to a user. In some embodiments, the preview function may display a key frame and some extracted non-key frames. For example, the terminal may select one non-key frame every five frames for displaying. In a preview area 1110 shown in FIG. 11, a user selects start and end points of a portion to be intercepted by sliding start and end controls. In addition, a content area to be intercepted may be determined through a selection box 1120. Finally, the user may select a hue preset by software, for example, a warm hue, a cool hue, a black and white hue, and the like.

After the user clicks/taps on a conversion button, the software may first obtain and save a temporal range parameter, an area range parameter, and the selected hue, and in a case that the user has not make modification thereto, default parameters are saved. To generate an edited video, a new file needs to be generated, and data of an original video cannot be directly intercepted and used. Therefore, the entire original video needs to be decoded, to obtain each frame of image, then corresponding images are intercepted according to the temporal range and the selected content range, and processed images are saved to an image sequence in a chronological order. In a case that the user selects to use the preselected hue, hue processing is added, which may be implemented by changing attributes, such as saturation and contrast, of an image. Finally, the images in the image sequence are re-encoded, to generate a new video file.

Figure 12:
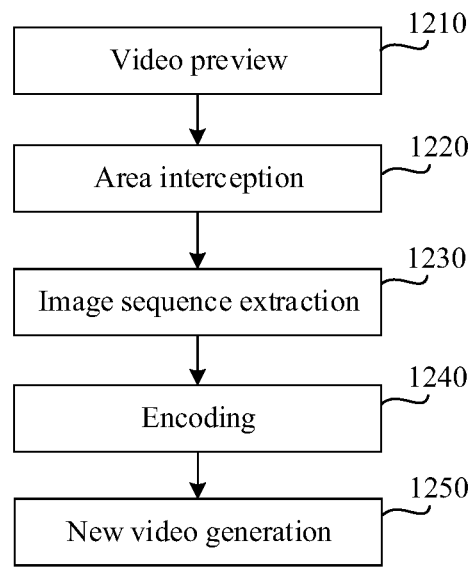
FIG. 12 is a flowchart of a video editing process according to some embodiments.

As shown in FIG. 12, the process includes processes such as: video preview 1210, area interception 1220, image sequence extraction 1230, encoding 1240, and new video generation 1250.

In some embodiments, a duration of the social video uploaded by the target account needs to be greater than a required duration, and the required duration may be preset or set according to needs, for example, 15 seconds. For example, the duration of the social video needs to be greater than 15 seconds.

In some embodiments, after the target account publishes a social video, the terminal of the target account receives a social selection message for the social video published by the target account, the social selection message being a message transmitted, for the social video published by the target account, to the target account by the social account in the live streaming application. An account type of the social account may be the same as or different from the target account. In some embodiments, a description is provided by an example in which the social account is a universal account. In other words, the social account not only can watch a live stream, but also can initiate a live stream, and can also use another function in the live streaming application.

The target account receives a social replying operation based on the social selection message, the social replying operation being used for indicating a social relationship with the social account and selected by the target account. For example, the social replying operation includes social consent operation and a social refusal operation. The social consent operation indicates that the target account consents to establish a two-way social relationship with the social account, and the social refusal operation indicates that the target account refuses to establish the social relationship with the social account.

The target account transmits a social replying message to the social account based on the social replying operation.

In response to the social replying operation used for indicating that the target account consents to establish the social relationship with the social account, a social consent message is transmitted to the social account; and the social relationship with the social account is established and a live streaming link is transmitted to the social account, the live streaming link being used for linking to a live streaming room of the target account.

In other words, the social account can watch the live stream of the target account through the live streaming link.

In some embodiments, the social account can have a dialog chat with the target account and have a video chat with the target account in a chat dialog box.

By the interaction method based on a live streaming application according to some embodiments, a video match function is provided to a target account in the live streaming application, the target account can select whether to establish a one-way social relationship with another account by checking a video published by the another account, so as to establish a two-way social relationship between the accounts after confirmation, so that the target account can watch a live stream through the social relationship, thereby increasing channels for watching a live stream, increasing methods for socializing between the accounts in the live streaming application, improving the social diversity, and increasing methods of interaction between the accounts.

Figure 13:
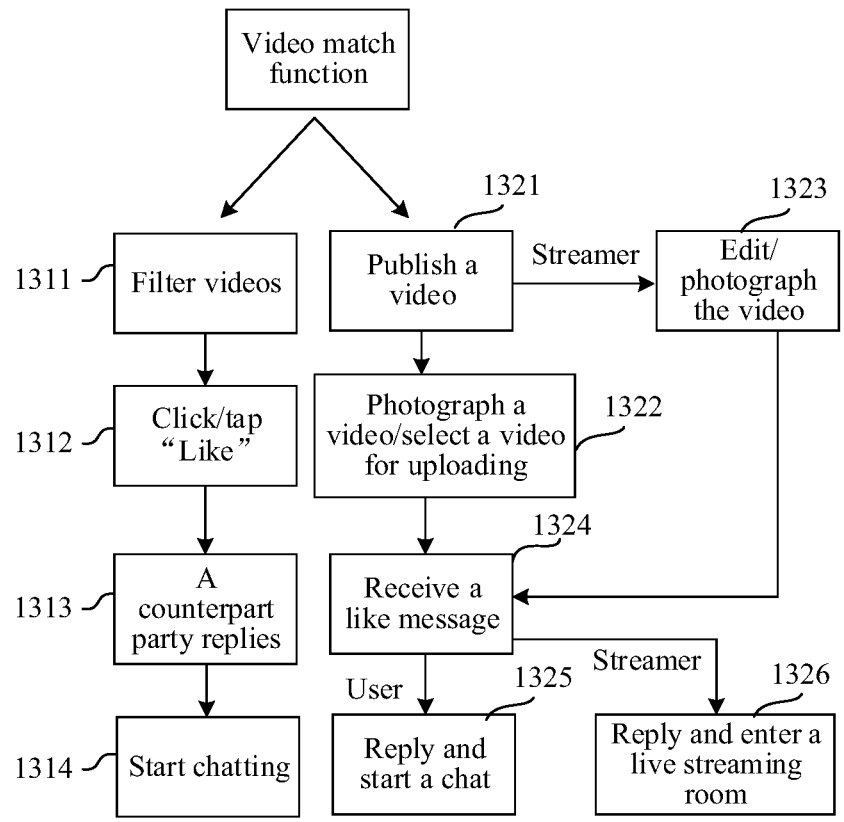
FIG. 13 is a schematic diagram of an overall process of an interaction method based on a live streaming application according to some embodiments.

FIG. 13 is a schematic diagram of an overall process of an interaction method based on a live streaming application according to some embodiments. As shown in FIG. 13, the process mainly includes two branches: video filtering (in other words, watching social videos uploaded by other users) and video publishing.

The following process is included in the branch of video filtering:

Operation 1311: Filter videos.

In other words, a user views the social videos uploaded by the other users and filters to select liked social videos from the social videos. A terminal may display a social video in a video interaction interface corresponding to a target account.

Operation 1312: Click/tap "Like".

After a social video is selected and "Like" is clicked/tapped on, a one-way social relationship between a current user and a user corresponding to the social video is established. The terminal may obtain a video selection operation on the displayed social video, determine a target social video selected by the video selection operation, and establish a one-way social relationship between the target account and the user account corresponding to the target social video in a case that a click/tap operation on a like control is obtained. The target social video refers to the social video selected by the video selection operation.

Operation 1313: A counterpart party replies.

In a case that the terminal receives a reply from the user account corresponding to the target social video, it indicates that the user account corresponding to the target social video consents to establish a two-way social relationship with the target account.

Operation 1314: Start chatting.

According to the two-way social relationship established between the two users, a chat interaction interface is displayed, and the two parties may perform a chat interaction in the chat interaction interface. Establishment of the two-way social relationship may be performed by a server. The terminal of the target account or the terminal corresponding to the target social video may display the chat interaction interface and receive content of the chat interaction through the chat interaction interface.

The branch of video publishing mainly includes the following processes:

Operation 1321: Publish a video.

In other words, a user photographs or selects a social video and upload the social video to a social platform. The terminal of the target account may display a video upload interface and receive a social video to be uploaded through the video upload interface. The social video to be uploaded may be a photographed video or may be a video stored in the terminal of the target account.

Operation 1322: Photograph a video/select a video for uploading.

The social video is obtained mainly through two methods, namely, obtaining and photographing, and the obtaining method further includes obtaining from the terminal locally and intercepting from a historical live stream process.

Operation 1323: Edit/photograph the video.

For the social video, the user may also edit the video, add some video editing effects, or the like. The terminal of the target account may display a video editing control corresponding to the social video, and in a case that a trigger operation, for example, a click/tap operation, on the video editing control is received, the terminal may display a video editing interface corresponding to the social video, receive a video editing operation through the video clip interface, and edit the social video.

Operation 1324: Receive a like message.

In other words, the current user receives a message that another user likes the social video and establishes a one-way social relationship with the current user. The terminal of the target account may receive a message of liking the published video from another terminal, and may also receive a message that another terminal establishes a one-way social relationship with the terminal of the target account.

Operation 1325: A user replies and starts a chat.

In a case that the current user is a common user, the current user replies to the like message and starts a chat with a counterpart user. In a case that the target account is a common account, the terminal of the target account may receive a replying message to the like message and start a chat interface with the account that transmits the like message.

Operation 1326: A streamer replies and enters a live streaming room.

In a case that the current user is a streamer user, the current user replies to the like message and enters the live streaming room for live streaming, invites the counterpart user as a guest streamer, or invites the counterpart user as an audience. In a case that the target account is a streamer account, the terminal of the target account may receive the replying message to the like message, display a live streaming room, and transmit an invitation message to the user account that transmits the like message, so as to invite the user account that transmits the like message as a guest streamer or as an audience.

To sum up, by the interaction method based on a live streaming application according to some embodiments, a video match function is provided to a target account in the live streaming application, the target account can select whether to establish a one-way social relationship with another account by checking a video published by the another account, so as to establish a two-way social relationship between the accounts after confirmation, so that the target account can watch a live stream through the social relationship, thereby increasing channels for watching a live stream, increasing methods for socializing between the accounts in the live streaming application, improving the social diversity, and increasing methods of interaction between the accounts.

Figure 14:
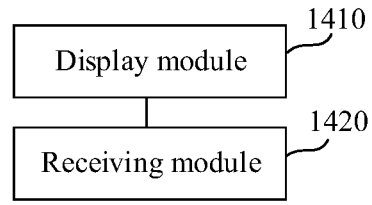
FIG. 14 is a structural block diagram of an interaction apparatus based on a live streaming application according to some embodiments.

FIG. 14 is a structural block diagram of an interaction apparatus based on a live streaming application according to some embodiments. As shown in FIG. 14, the apparatus includes:

a display module 1410, configured to display a video interaction interface in the live streaming application, the video interaction interface including a video display area of at least one live streaming account, and the video display area including a social video uploaded by the at least one live streaming account; and a receiving module 1420, configured to receive a social selection operation on the video interaction interface based on the social video, the social selection operation being used for establishing a one-way social relationship between a target account and the live streaming account corresponding to the social video, and the target account being a currently logged-in account in the live streaming application;

the display module 1410 being further configured to, in response to a social relationship confirmation signal of the live streaming account corresponding to the social video, display a social interaction interface for a social interaction with the live streaming account corresponding to the social video, the social interaction interface including a live streaming room channel for starting a live streaming room of the live streaming account corresponding to the social video.

In some embodiments, the display module 1410 is further configured to display a dialog box interface for a chat interaction between the live streaming account corresponding to the social video and the target account;

or the display module 1410 is further configured to display a video interface for a video call interaction between the live streaming account corresponding to the social video and the target account;

or the display module 1410 is further configured to display a live streaming interface for the live streaming account corresponding to the social video and the target account as interaction streamers;

or the display module 1410 is further configured to display a live stream entrance interface for watching the live streaming room by the target account as an audience account.

In some embodiments, the display module 1410 is further configured to display the live stream entrance interface, the live stream entrance interface including a live stream entrance control, the live stream entrance interface being used for providing a live streaming room channel for entering the live streaming room, and the live streaming account corresponding to the social video being used as a streamer account of the live streaming room;

the receiving module 1420 is further configured to receive a trigger operation on the live stream entrance control; and the display module 1410 is further configured to display a live streaming room interface based on the trigger operation, the live streaming room interface including a screen in which the live streaming account corresponding to the social video performs a live stream.

Figure 15:
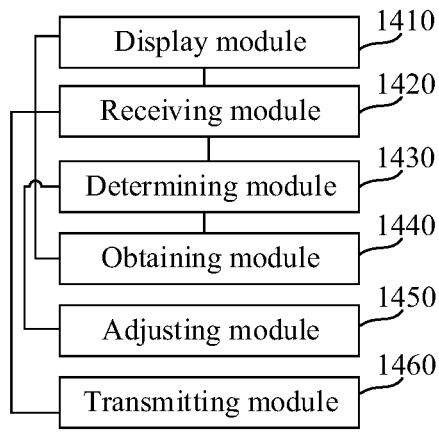
FIG. 15 is a structural block diagram of an interaction apparatus based on a live streaming application according to some embodiments.

In some embodiments, as shown in FIG. 15, the apparatus further includes:

a determining module 1430, configured to determine a quantity of times of social selection by the target account within a historical period of time;

the receiving module 1420 being further configured to, in a case that the quantity of times of social selection is within a quantity of times range, receive the social selection operation on the video interaction interface based on the social video.

In some embodiments, the determining module 1430 is further configured to, in a case that the target account has a first account permission, determine the quantity of times range corresponding to the target account as a first range;

the determining module 1430 is further configured to, in a case that the target account has a second account permission, determine the quantity of times range corresponding to the target account as a second range, the first account permission being higher than the second account permission, and the first range being greater than the second range.

In some embodiments, the display module 1410 is further configured to display a cover image of the social video in the video display area, the cover image being an image obtained by blurring an original image;

the receiving module 1420 is further configured to receive a selection operation on the cover image and pay a corresponding quantity of exchange resources for the social video based on the selection operation; and the display module 1410 is further configured to play the social video in the video display area based on the exchange resources.

In some embodiments, the apparatus further includes:

an obtaining module 1440, configured to obtain the original image, the original image being an image corresponding to the social video set by the target account; and the apparatus further includes:

a determining module 1430, configured to determine a blurring window in the original image, the blurring window being a processing window for blurring the original image; and determine a weight value for a pixel in the blurring window by using a central pixel as a reference; and an adjusting module 1450, configured to adjust a pixel value of the pixel based on the weight value, to obtain the cover image.

In some embodiments, the display module 1410 is further configured to display a video upload interface, the video upload interface including an upload control; and in response to a trigger operation on the upload control, display a video selecting interface or displaying a video photographing interface; and the apparatus further includes:

an obtaining module 1440, configured to obtain video data in the video selecting interface or the video photographing interface, for uploading as a social video of the target account.

In some embodiments, the receiving module 1420 is further configured to receive a social selection message for the social video of the target account, the social selection message being a message transmitted, for the social video of the target account, to the target account by a social account in the live streaming application;

the receiving module 1420 is further configured to receive a social replying operation based on the social selection message, the social replying operation being used for indicating a social relationship with the social account and selected by the target account; and the apparatus further includes:

a transmitting module 1460, configured to transmit a social replying message to the social account based on the social replying operation.

In some embodiments, the transmitting module 1460 is further configured to, in response to the social replying operation used for indicating that the target account consents to establish the social relationship with the social account, transmit a social consent message to the social account; and establish the social relationship with the social account and transmit a live streaming room link to the social account, the live streaming room link being used for linking to a live streaming room of the target account.

By the interaction apparatus based on a live streaming application according to some embodiments, a video match function is provided to a target account in the live streaming application, the target account can select whether to establish a one-way social relationship with another account by checking a video published by the another account, so as to establish a two-way social relationship between the accounts after confirmation, so that the target account can watch a live stream through the social relationship, thereby increasing channels for watching a live stream, increasing methods for socializing between the accounts in the live streaming application, improving the social diversity, and increasing methods of interaction between the accounts.

Figure 16:
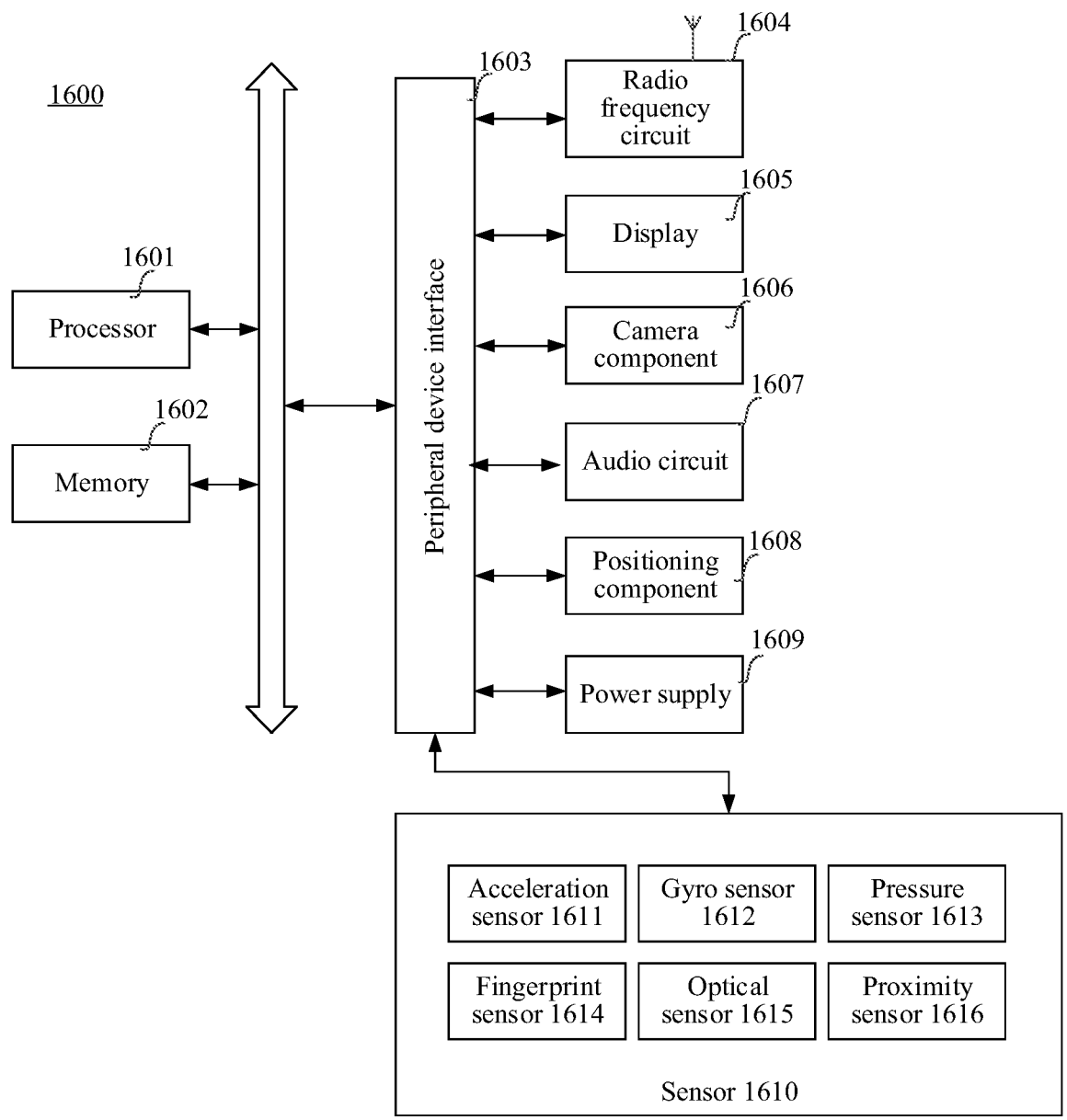
FIG. 16 is a structural block diagram of a terminal according to some embodiments.

FIG. 16 shows a structural block diagram of an electronic device 1600 according to some embodiments. The electronic device 1600 may be a portable mobile terminal, such as a smartphone, a tablet computer, a Moving Picture Experts Group Audio Layer III (MP3) player, a Moving Picture Experts Group Audio Layer IV (MP4) player, a notebook computer, or a desktop computer. The electronic device 1600 may also be referred to as another name such as user equipment, a portable terminal, a laptop terminal, or a desktop terminal.

The electronic device 1600 usually includes: a processor 1601 and a memory 1602.

The processor 1601 may include one or more processing cores, and may be, for example, a 4-core processor or an 8-core processor. The processor 1601 may be implemented in at least one hardware form of a digital signal processor (DSP), a field-programmable gate array (FPGA), and a programmable logic array (PLA). The processor 1601 may also include a main processor and a coprocessor. The main processor is a processor configured to process data in an active state, also referred to as a central processing unit (CPU). the coprocessor is a low-power processor configured to process data in a standby state. In some embodiments, the processor 1601 may be integrated with a graphics processing unit (GPU). The GPU is configured to render and draw content that needs to be displayed on a display. In some embodiments, the processor 1601 may further include an AI processor. The AI processor is configured to process a computing operation related to machine learning.

The memory 1602 may include one or more computer-readable storage media that may be non-transitory. The memory 1602 may further include a high-speed random access memory and a non-volatile memory, for example, one or more disk storage devices or flash storage devices. In some embodiments, the non-transitory computer-readable storage medium in the memory 1602 is configured to store at least one instruction, the at least one instruction being executed by the processor 1601 to implement the interaction method based on a live streaming application provided in the method embodiments.

In some embodiments, the electronic device 1600 may further include: a peripheral device interface 1603 and at least one peripheral device. The processor 1601, the memory 1602, and the peripheral device interface 1603 may be connected through a bus or a signal cable. Each peripheral device may be connected to the peripheral device interface 1603 through a bus, a signal cable, or a circuit board. Further, the peripheral device includes: at least one of a radio frequency circuit 1604, a display screen 1605, a camera component 1606, an audio circuit 1607, a positioning component 1608, and a power supply 1609.

The peripheral device interface 1603 may be configured to connect the at least one peripheral device related to input/output (I/O) to the processor 1601 and the memory 1602. In some embodiments, the processor 1601, the memory 1602, and the peripheral device interface 1603 are integrated on the same chip or the same circuit board. In some other embodiments, any or both of the processor 1601, the memory 1602, and the peripheral device interface 1603 may be implemented on an independent chip or circuit board. This is not limited in this embodiment.

The radio frequency circuit 1604 is configured to receive and transmit a radio frequency (RF) signal that is also referred to as an electromagnetic signal. The RF circuit 1604 communicates with a communication network and other communication devices through the electromagnetic signal. The RF circuit 1604 converts an electrical signal into an electromagnetic signal for transmission, or converts a received electromagnetic signal into an electrical signal. In some embodiments, the radio frequency circuit 1604 may include: an antenna system, an RF transceiver, one or more amplifiers, a tuner, an oscillator, a digital signal processor, a codec chipset, a user identity module card, and the like. The RF circuit 1604 may communicate with other terminals by using at least one wireless communication protocol. The wireless communication protocol includes but is not limited to a world wide web, a metropolitan area network, an intranet, generations of mobile communication networks (2G, 3G, 4G, and 5G), a wireless local area network, and/or a wireless fidelity (Wi-Fi) network. In some embodiments, the RF circuit 1604 may further include a circuit related to near field communication (NFC). This is not limited herein.

The display screen 1605 is configured to display a user interface (UI). The UI may include graphics, text, icons, videos, and any combination thereof. When the display screen 1605 is a touch display screen, the display screen 1605 is further capable of collecting touch signals on or above a surface of the display screen 1605. The touch signal may be inputted, as a control signal, to the processor 1601 for processing. In this case, the display screen 1605 may be further configured to provide a virtual button and/or a virtual keyboard that are/is also referred to as a soft button and/or a soft keyboard. In some embodiments, there may be one display screen 1605, disposed on a front panel of the electronic device 1600. In some other embodiments, there are at least two display screens 1605, disposed on different surfaces of the electronic device 1600 respectively or in a folded manner. In some other embodiments, the display screen 1605 may be a flexible display screen, disposed on a curved surface or a folded surface of the electronic device 1600. The display screen 1605 may further be set to have a non-rectangular irregular graph, that is, a special-shaped screen. The display screen 1605 may be prepared by using materials such as a liquid crystal display (LCD), an organic light-emitting diode (OLED), or the like.

The camera component 1606 is configured to collect images or videos. In some embodiments, the camera component 1606 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1606 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1607 may include a microphone and a speaker. The microphone is configured to collect sound waves of users and surroundings, and convert the sound waves into electrical signals and input the signals to the processor 1601 for processing, or input the signals to the RF circuit 1604 to implement voice communication. For the purpose of stereo sound collection or noise reduction, there may be a plurality of microphones, respectively disposed at different parts of the electronic device 1600. The microphone may further be an array microphone or an omni-directional collection type microphone. The speaker is configured to convert electrical signals from the processor 1601 or the RF circuit 1604 into sound waves. The speaker may be a conventional film speaker, or may be a piezoelectric ceramic speaker. When the speaker is the piezoelectric ceramic speaker, the speaker can not only convert electrical signals into sound waves audible to a human being, but also convert electrical signals into sound waves inaudible to the human being for ranging and other purposes. In some embodiments, the audio circuit 1607 may further include a headphone jack.

The positioning component 1608 is configured to position a current geographic location of the electronic device 1600, to implement a navigation or a location based service (LBS). The positioning component 1608 may be a positioning component based on the Global Positioning System (GPS) of the United States, the BeiDou system of China, and the GALILEO system of the European Union.

The power supply 1609 is configured to supply power to components in the electronic device 1600. The power supply

1609 may be an alternating-current power supply, a direct-current power supply, a disposable battery, or a rechargeable battery. When the power supply 1609 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may further be configured to support a quick charge technology.

In some embodiments, the electronic device 1600 further includes one or more sensors 1610. The one or more sensors 1610 include but are not limited to an acceleration sensor 1611, a gyro sensor 1612, a pressure sensor 1613, a fingerprint sensor 1614, an optical sensor 1615, and a proximity sensor 1616.

The acceleration sensor 1611 may detect acceleration on three coordinate axes of a coordinate system established by the electronic device 1600. For example, the acceleration sensor 1611 may be configured to detect components of gravity acceleration on the three coordinate axes. The processor 1601 may control, according to a gravity acceleration signal collected by the acceleration sensor 1611, the display screen 1605 to display the user interface in a frame view or a portrait view. The acceleration sensor 1611 may be further configured to collect data of a game or a user movement.

The gyroscope sensor 1612 may detect a body direction and a rotation angle of the electronic device 1600. The gyroscope sensor 1612 may cooperate with the acceleration sensor 1611 to collect a 3D action by the user on the electronic device 1600. The processor 1601 may implement the following functions according to the data collected by the gyro sensor 1612: motion sensing (for example, change of the UI based on a tilt operation of the user), image stabilization during photographing, game control, and inertial navigation.

The pressure sensor 1613 may be disposed on a side frame of the electronic device 1600 and/or a lower layer of the display screen 1605. In a case that the pressure sensor 1613 is disposed at the side frame of the electronic device 1600, a holding signal of the user on the electronic device 1600 may be detected, and left/right hand identification or a quick action may be performed by the processor 1601 according to the holding signal collected by the pressure sensor 1613. When the pressure sensor 1613 is disposed on the low layer of the display screen 1605, the processor 1601 controls, according to a pressure operation of the user on the display screen 1605, an operable control on the UI. The operable control includes at least one of a button control, a scroll-bar control, an icon control and a menu control.

The fingerprint sensor 1614 is configured to collect a fingerprint of the user. The processor 1601 recognizes an identity of the user according to the fingerprint collected by the fingerprint sensor 1614, or the fingerprint sensor 1614 recognizes an identity of the user according to the collected fingerprint. In a case that the user's identity is recognized to be a trusted identity, the processor 1601 authorizes the user to perform related sensitive operations. The sensitive operations include: unlocking a screen, viewing encryption information, downloading software, paying and changing a setting, and the like. The fingerprint sensor 1614 may be disposed on a front face, a back face, or a side face of the electronic device 1600. In a case that a physical button or a vendor logo is disposed on the electronic device 1600, the fingerprint sensor 1614 may be integrated together with the physical button or the vendor logo.

The optical sensor 1615 is configured to collect ambient light intensity. In an embodiment, the processor 1601 may control display luminance of the display screen 1605 according to the ambient light intensity collected by the optical sensor 1615. Further, in a case that the ambient light intensity is relatively high, the display luminance of the display screen 1605 is increased, and in a case that the ambient light intensity is relatively low, the display luminance of the touch display screen 1605 is reduced. In another embodiment, the processor 1601 may further dynamically adjust a camera parameter of the camera component 1606 according to the ambient light intensity collected by the optical sensor 1615.

The proximity sensor 1616, also referred to as a distance sensor, is usually disposed on the front panel of the electronic device 1600. The proximity sensor 1616 is configured to collect a distance between a front face of the user and the front face of the electronic device 1600. In an embodiment, when the proximity sensor 1616 detects that the distance between the user and the front surface of the electronic device 1600 gradually becomes smaller, the display screen 1605 is controlled by the processor 1601 to switch from a screen-on state to a screen-off state. In a case that the proximity sensor 1616 detects that the distance between the user and the front of the electronic device 1600 gradually becomes larger, the display screen 1605 is controlled by the processor 1601 to switch from the screen-off state to the screen-on state.

A person skilled in the art may understand that a structure shown in FIG. 16 constitutes no limitation on the electronic device 1600, and the electronic device may include more or fewer components than those shown in the figure, or some components may be combined, or a different component deployment may be used.

The interaction apparatus based on a live streaming application provided in the foregoing embodiments is illustrated with an example of division of the foregoing functional modules. In an actual application, the functions may be allocated to and completed by different functional modules according to requirements, that is, the internal structure of the device is divided into different functional modules, to implement all or some of the functions described above. In addition, the interaction apparatus based on a live streaming application provided in the foregoing embodiments and the embodiments of the interaction method based on a live streaming application belong to a same concept. For a specific implementation process of the interaction apparatus based on a live streaming application, reference may be made to the method embodiments.

Some embodiments may further provide a computer device. The computer device includes a processor and a memory. The memory stores at least one instruction, at least one program, a code set, or an instruction set, and the at least one instruction, the at least one program, the code set, or the instruction set is loaded and executed by the processor to implement the interaction method based on a live streaming application according to the foregoing method embodiments.

Some embodiments may further provide a non-transitory computer-readable storage medium, storing at least one instruction, at least one program, a code set, or an instruction set, the at least one instruction, the at least one program, the code set, or the instruction set being loaded and executed by a processor to implement the interaction method based on a live streaming application provided in the foregoing method embodiments.

Some embodiments may further provide a computer program product or a computer program. The computer program product or the computer program includes computer instructions, and the computer instructions are stored in a computer-readable storage medium. A processor of a computer device reads the computer instructions from the computer-readable storage medium and executes the computer instructions to cause the computer device to perform the interaction method based on a live streaming application described in any one of the foregoing embodiments.

The computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments are merely for description purpose, and do not indicate any preference among the embodiments A person of ordinary skill in the art may understand that all or part of the operations of implementing the foregoing embodiments may be implemented by hardware, or may be implemented by a program instructing related hardware. The program may be stored in a computer-readable storage medium. The storage medium mentioned may be a read-only memory, a magnetic disk or an optical disc.

The foregoing descriptions are merely example embodiments of the disclosure, and are not intended to limit the disclosure. Any modification, equivalent replacement, or improvement made within the spirit and principle of the disclosure shall fall within the protection scope of the disclosure and the appended claims.

What is claimed is:

1. An interaction method, performed by a computer device, the interaction method comprising:
   displaying a video interaction interface in a live streaming application, the video interaction interface comprising a social video uploaded by a live streaming account;
   receiving a selection operation on the social video, the selection operation being used for establishing a one-way social relationship between a target account and the live streaming account corresponding to the social video, and the target account being a currently logged-in account in the live streaming application; and
   based on receiving a social relationship confirmation signal of the live streaming account corresponding to the social video, establishing a two-way social relationship between the target account and the live streaming account corresponding to the social video and displaying a social interaction interface for a social interaction with the live streaming account corresponding to the social video, the social interaction interface comprising a live streaming room channel for starting a live streaming room of the live streaming account corresponding to the social video, wherein
   the target account maintains the one-way social relationship with the live streaming account after the one-way social relationship has been established and before the two-way social relationship has been established until a preset duration of time expires, and
   the receiving the selection operation comprises:
      determining a quantity of times of the selection operation by the target account within a historical period of time; and
      in a case that the quantity of times of selection is within a predetermined range, effectuating the selection operation on the social video.

2. The interaction method according to claim 1, wherein the displaying a social interaction interface comprises:
   displaying a dialog box interface for a chat interaction between the live streaming account corresponding to the social video and the target account.

3. The interaction method according to claim 1, wherein the displaying a social interaction interface comprises:
   displaying a video interface for a video call interaction between the live streaming account corresponding to the social video and the target account.

4. The interaction method according to claim 1, wherein the displaying a social interaction interface comprises:
   displaying a live streaming interface wherein the live streaming account corresponding to the social video and the target account are participating streamers.

5. The interaction method according to claim 1, wherein the displaying a social interaction interface comprises:
   displaying a live stream entrance interface for watching the live streaming wherein the target account is an audience.

6. The interaction method according to claim 1, wherein the method further comprises:
   in a case that the target account has a first account permission, setting a range corresponding to the first account permission as the predetermined range of the target account; and
   in a case that the target account has a second account permission, setting a range corresponding to the second account permission as the predetermined range of the target account, the first account permission being higher than the second account permission, and the first range being larger than the second range.

7. The interaction method according to claim 1 further comprising:
   displaying a cover image of the social video in the video display area, the cover image being a blurred image corresponding to the social video;
   receiving a selection operation on the cover image and a payment operation for the social video; and
   playing the social video in the video interaction interface.

8. The interaction method according to claim 1, wherein the method further comprises:
   uploading a social video of the target account.

9. The interaction method according to claim 8, wherein the method further comprises:
   receiving a selection message for the social video of the target account, the selection message informing that the social video of the target account has been selected by a social account different from the target account.

10. The interaction method according to claim 9, wherein the method further comprises:
    receiving a social replying operation based on the selection message;
    in response to the social replying operation, establishing a social relationship between the target account and the social account; and
    transmitting a live streaming room link to the social account, the live streaming room link being used for accessing a live streaming room of the target account.

11. An interaction apparatus comprising:
    at least one memory configured to store program code; and
    at least one processor configured to read the program code and operate as instructed by the program code, the program code comprising:
    display code configured to cause at least one of the at least one processor to display a video interaction interface in a live streaming application, the video interaction interface comprising a social video uploaded by a live streaming account; and receiving code configured to cause at least one of the at least one processor to receive a selection operation on the social video, the selection operation being used for establishing a one-way social relationship between a target account and the live streaming account corresponding to the social video, and the target account being a currently logged-in account in the live streaming application;

the display code being further configured to cause at least one of the at least one processor to, based on receiving a social relationship confirmation signal of the live streaming account corresponding to the social video, establish a two-way social relationship between the target account and the live streaming account corresponding to the social video and display a social interaction interface for a social interaction with the live streaming account corresponding to the social video, the social interaction interface comprising a live streaming room channel for starting a live streaming room of the live streaming account corresponding to the social video, wherein the target account maintains the one-way social relationship with the live streaming account after the one-way social relationship has been established and before the two-way social relationship has been established until a preset duration of time expires, and the receiving code is further configured to cause the at least one processor to:
 determine a quantity of times of the selection operation by the target account within a historical period of time; and
 in a case that the quantity of times of selection is within a predetermined range, effectuate the selection operation on the social video.

12. The interaction apparatus according to claim 11, wherein the display code is further configured to cause the at least one of the at least one processor to display a dialog box interface for a chat interaction between the live streaming account corresponding to the social video and the target account.

13. The interaction apparatus according to claim 11, wherein the display code is further configured to cause the at least one of the at least one processor to display a video interface for a video call interaction between the live streaming account corresponding to the social video and the target account.

14. The interaction apparatus according to claim 11, wherein the display code is further configured to cause the at least one of the at least one processor to display a live stream entrance interface for watching the live streaming wherein the target account is an audience.

15. A non-transitory computer-readable storage medium, storing computer code that, when executed by at least one processor, causes the at least one processor to at least:
 display a video interaction interface in the live streaming application, the video interaction interface comprising a video display area of at least one live streaming account, and the video display area comprising a social video uploaded by the at least one live streaming account;
 receive a social selection operation on the video interaction interface based on the social video, the social selection operation being used for establishing a one-way social relationship between a target account and the live streaming account corresponding to the social video, and the target account being a currently logged-in account in the live streaming application; and
 based on receiving a social relationship confirmation signal of the live streaming account corresponding to the social video, establish a two-way social relationship between the target account and the live streaming account corresponding to the social video and display a social interaction interface for a social interaction with the live streaming account corresponding to the social video, the social interaction interface comprising a live streaming room channel for starting a live streaming room of the live streaming account corresponding to the social video, wherein
 the target account maintains the one-way social relationship with the live streaming account after the one-way social relationship has been established and before the two-way social relationship has been established until a preset duration of time expires, and
 the receive the selection operation comprises:
  determining a quantity of times of the selection operation by the target account within a historical period of time; and
  in a case that the quantity of times of selection is within a predetermined range, effectuating the selection operation on the social video.

16. The non-transitory computer-readable storage medium according to claim 15, wherein the social interaction interface comprises:
 a dialog box interface for a chat interaction between the live streaming account corresponding to the social video and the target account.

17. The non-transitory computer-readable storage medium according to claim 15, wherein the social interaction interface comprises:
 a video interface for a video call interaction between the live streaming account corresponding to the social video and the target account.

18. The non-transitory computer-readable storage medium according to claim 15, wherein the social interaction interface comprises:
 a live streaming interface wherein the live streaming account corresponding to the social video and the target account are participating streamers.

19. The non-transitory computer-readable storage medium according to claim 15, wherein the social interaction interface comprises:
 a live stream entrance interface for watching the live streaming wherein the target account is an audience.

* * * * *